(12) United States Patent
Harris et al.

(10) Patent No.: US 6,580,303 B1
(45) Date of Patent: Jun. 17, 2003

(54) DATAPATH CONTROL CIRCUIT WITH ADJUSTABLE DELAY ELEMENTS

(75) Inventors: David L. Harris, Claremont, CA (US); Gregg Hoyer, Seattle, WA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/630,443

(22) Filed: Aug. 2, 2000

(51) Int. Cl.[7] .............................................. H03H 11/26
(52) U.S. Cl. ....................................... 327/276; 327/299
(58) Field of Search ................................ 327/276, 270, 327/271, 272, 277, 278, 284, 285, 299, 291, 295, 395, 400

(56) References Cited

U.S. PATENT DOCUMENTS

| | | | | |
|---|---|---|---|---|
| 5,553,276 A | * | 9/1996 | Dean ........................... | 713/500 |
| 5,724,562 A | * | 3/1998 | Ishiwaki et al. ............ | 713/400 |
| 6,188,262 B1 | * | 2/2001 | Sutherland ................... | 327/295 |
| 6,211,704 B1 | * | 4/2001 | Kong .......................... | 326/121 |

* cited by examiner

*Primary Examiner*—Kenneth B. Wells
*Assistant Examiner*—Cassandra Cox
(74) *Attorney, Agent, or Firm*—Townsend and Townsend and Crew LLP

(57) ABSTRACT

A control circuit for a FIFO datapath is described. The control circuit consists of a chain of Muller C-elements with adjustable delay elements placed between the output of each Muller C-element and one of the inputs of the preceding and successive Muller C-elements. The adjustable delay elements allow the control circuit to match the delays of processing elements in the datapath, thereby creating overall faster operation.

23 Claims, 3 Drawing Sheets

DATAPATH CONTROL CIRCUIT WITH ADJUSTABLE DELAY ELEMENTS

BACKGROUND OF THE INVENTION

This invention relates to control circuits, and in particular to asynchronous control circuits having adjustable delay elements.

Control circuits for controlling data flow in datapath circuits are well known for use in asynchronous systems. For example, in a paper entitled "Counterflow Pipeline Processor Architecture," by R. Sproul, I. Sutherland, and C. Molnar, Sun Microsystems Laboratories, Inc., Publication No. SMLI TR-94-25, April 1994, counterflowing datapaths are controlled using a sequence of Muller C-elements. FIG. 1 of this application illustrates a simple control system such as described in that paper.

In a pipeline processor such as described in the paper mentioned above, there are at least two uses for the control system. First, the control system can provide for concurrent arbitration and data advance. Second, if there are multiple instruction pipes, the interlocked control system can help keep the instruction streams in the multiple pipes in proper order. That is, instructions in one processor are prevented from passing those in another processor.

FIG. 1 depicts a system in which a first-in first-out (FIFO) datapath is controlled by a network of Muller C-elements. The series of interlinked Muller C-elements receive request and acknowledge signals, and in response control processing cells (PC). Data or instructions, or both, are introduced at the input terminals of the processing cells and propagate along the FIFO processor, eventually emerging at the output terminals in the same order as introduced. Each cell performs a desired operation with the instructions or the data. The Muller C-elements assure that the processor passes information through the FIFO in sequence and that information advances only when it is ready to advance. The Muller C-elements provide a sequential activation of the processing cells, resulting in processing of the information through the datapath.

Each Muller C-element shown in FIG. 1 functions to produce an output event after each of its input terminals receives an event. The bubble on one input terminal of each Muller C-element indicates that initially, after master clear, that element behaves as if an event had already been received.

A request input signal R and an acknowledge output signal A are shown. A request event causes information to propagate down the chain of processing cells and emerge at the right end. The acknowledge signal from each successive Muller C-element enables the previous Muller C-element to receive the next request input signal and propagate that request, in turn, through the chain.

The C-element output signals control latches that sequence the data along the datapath. The rate at which requests and acknowledges propagate through the C-element control circuits determines the rate at which the latches are made opaque and transparent. If this rate is too fast, the datapath cannot keep up and data will be lost. On the other hand, if this rate is too slow, the performance of the system will be low. Therefore, the designer is faced with the tricky task of building a control circuit that has just enough delay so the datapath can keep up, but no more, to try to maximize performance. Because the consequence of too little delay is that the circuit fails, designers must be conservative and provide extra delay. The amount of extra delay required depends on the matching of transistors and therefore is hard to predict at the time the circuit is designed, requiring even more margin. If there were a way to provide an adjustable delay that could be tuned after manufacturing, asynchronous circuits could operate faster because less margin would be required.

SUMMARY OF THE INVENTION

This invention provides an improved control circuit for a FIFO datapath or other use. The improved control circuit is provided with adjustable delay elements between each of the Muller C-elements, enabling each of the output nodes of the control circuit to provide an appropriate control signal in a precise timing relationship with that required by the datapath. In a preferred embodiment, this is achieved by placing an adjustable delay element between the output node of each Muller C-element and the input node of one or both of the subsequent and previous Muller C-elements connected to that output node. By tuning the adjustable delay elements to correspond to the delays inherent in the processing operations in the datapath, higher performance is achieved.

In a preferred embodiment an asynchronous system includes a datapath which has a plurality of stages for performing processing operations on data supplied to them and a control path coupled to the datapath which controls the operation of the datapath. The control path includes adjustable delay elements to enable control of the timing of operations within the control path.

In another preferred embodiment, a sequence of Muller C-elements is provided, with a first element controlling a first output node, a second element controlling a second output node, and a third element controlling a third output node. A first delay element is connected between the first output node and a first input terminal of the second Muller C-element and a second delay element is connected between the second output node and the first input terminal of the third Muller C-element. First, second and third datapath elements are coupled to be controlled by the first, second and third output nodes, respectively.

DESCRIPTION OF THE SPECIFIC EMBODIMENTS

Figure 1:
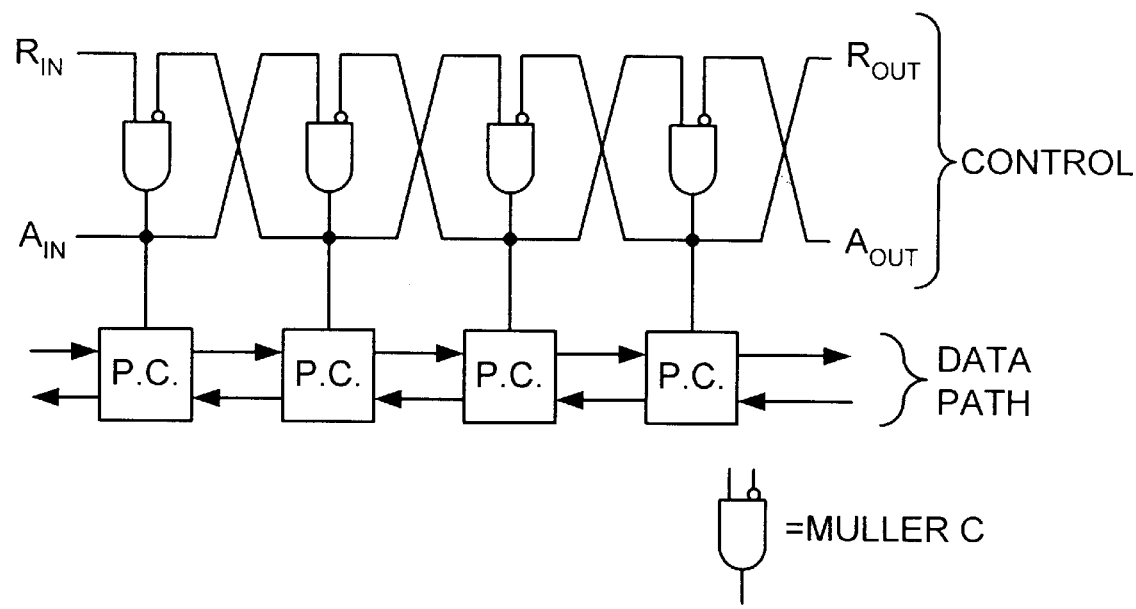
FIG. 1 illustrates a prior art control circuit for a FIFO datapath.
Figure 2:
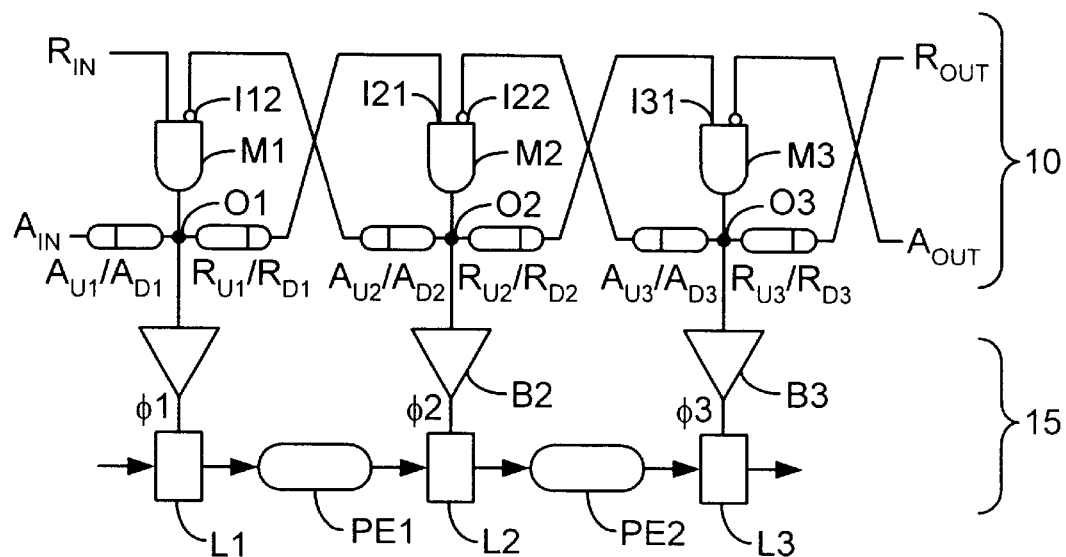
FIG. 2 is a block diagram of an embodiment of the invention.

FIG. 2 is a block diagram illustrating a preferred embodiment of a control circuit 10 coupled to control a datapath 15. Datapath 15 includes latches L1, L2 and L3, as well as processing elements PE1 and PE2. These processing elements perform combinational logic on input signals supplied to them, then pass the resulting output signals onto the next latch for subsequent processing in the next processing element. Of course other types of processes also may be performed. Importantly, each combinational logic element, or processing element, will have an inherent delay in performing the operations it is designed to perform.

The datapath 15 is referred to as a first-in first-out (FIFO) datapath because the results of each operation are passed to a subsequent stage for further activity. The result is that the instructions supplied to the datapath first will emerge from the datapath before instructions supplied to the datapath later. This is in keeping with conventional models of instruction execution.

The FIFO datapath 15 is controlled by a control circuit 10. In the diagram of FIG. 2, although only three stages of the control circuit 10 and datapath 15 are shown, it will be appreciated as many stages as necessary can be employed. The control circuit 10 includes a series of interconnected Muller C-elements M1, M2 and M3. The function of the Muller C-elements is to activate the latches L1, L2 and L3 coupled to the output nodes O1, O2 and O3, respectively, of the Muller C-elements. The set of interconnections among the Muller C-elements M1, M2 and M3 assure that information is passed through the datapath 15 in sequence and advanced only when ready.

The operation of the Muller C-elements will be explained with respect to element M2. The other elements function similarly. Muller C-element M2 will produce an output event, i.e., a transition, on its output terminal O2 after each of its input terminals I21, I22 receives an event. The bubble on input terminal I22 indicates that initially, after master clear, Muller C-element M2 behaves as if an event had already been received.

A request signal $R_{in}$ and an acknowledge signal $A_{in}$ appear at the left end of the chain. A request event causes information to propagate down the chain of processing elements and to emerge at the right end. The acknowledge signal from each successive Muller C-element enables the previous Muller C-element to receive the next request input signal and propagate that request down the chain.

The control circuit shown in FIG. 2 also includes a series of delay elements $A_{U1}/A_{D1}$, $R_{U1}/R_{D1}$, $A_{U2}/A_{D2}$, $R_{U2}/R_{D2}$, $A_{U3}/A_{D3}$ and $R_{U3}/R_{D3}$. These delay elements are placed between each output node, for example O2, and the input nodes of the adjacent Muller C-elements, for example, I12 and I31.

In the scheme depicted, the interconnected Muller C-elements enforce the timing constraints between the latches. The use of the delay elements permits the rising (U for up) and falling (D for down) delays of each request and acknowledge signal to be, in principle, independently selected. By assuming an ideal Muller C-element with zero delay, all the actual Muller C-element delays can be considered part of the delay element D delays. In addition, if the buffers have matched delays, then the clock signals $\Phi 1$, $\Phi 2$ and $\Phi 3$ which arrive at the datapath latches will have essentially the same phase relationship as the output signals from the Muller C-elements.

In the preferred embodiment, the delay of each of the delay elements $A_{U1}/A_{D1}$, $R_{U1}/R_{D1}$, ..., $R_{U3}/R_{D3}$ is independently selectable using any well known technique. For example, as described below, a current-starved inverter can be used to control the delay. In addition, other well known techniques such as providing a laser trimmable serpentine delay line or a capacitor in series with a partially-on transistor can also be used. As such, the particular technique employed is not important.

The manner in which the delays are selected is described next. In a synchronous system, both maximum and minimum delay constraints between latches must be satisfied so that the latches do not become opaque before data arrives from the preceding processing element, and so that new data does not overtake data already in the datapath pipeline 15. These constraints can be considered as setup and hold checks. In an asynchronous system, these constraints must be satisfied, as well as a hand-shaking constraint discussed below.

Consider a system in which all the Muller C-elements M1, M2, M3 are initially low, and thus all latches are initially opaque. If data is then sent to the input of latch L1, and following that $R_{in}$ is raised to signal the validity of the data, latch L1 will become transparent, then following that by a delay set by delay element $R_{U1}$, latch L2 will become transparent. Thus, control will propagate through the control circuit 10 with the delay of $R_{U1}$, $R_{U2}$, $R_{U3}$ per stage. By setting these delays to exactly match the delay of the corresponding processing elements, data can be made to arrive at each latch essentially exactly as that latch becomes transparent. Because of manufacturing tolerances and difficulty in exactly matching delays, a conservative approach is to set these delays slightly longer than the delay of the processing elements. This will cause data which arrives at each latch to arrive just before the latch becomes transparent.

Thus, in one sense, the role of each latch is not so much to temporarily store data, but to prevent fast-moving data from overtaking slower-moving data further along in the pipeline. Were these delay elements set shorter than the delay of the processing elements, then the data would arrive at the latch when the latch is already transparent. Data would then immediately propagate through the latch. Herein this effect is referred to as "time borrowing." If multiple stages of the control path, however, each have request delays that are too short, so much time will be borrowed that eventually the setup time of a latch will be missed. If the request delays, however, are on average longer than the processing element delays, but do not perfectly track the processing element delays, time borrowing is useful because it allows the system to operate at an average performance, rather than forcing every request to be longer than its corresponding data delay. The constraint that these delays, on average, be greater than or equal to the corresponding processing element delays, is analogous to the maximum delay constraint in a synchronous system.

The hold time, or minimum delay constraint, requires the data not change at a latch until some time after the latch becomes opaque. Otherwise the new data may slip through the latch and interfere with the previous data. Thus, this constraint implies a lower bound on the delays in the acknowledge path which prevent a latch from becoming opaque until the previous latch becomes transparent. Specifically, the falling acknowledge delay $A_{D2}$ from latch L2 becoming opaque to the previous latch L1 becoming transparent must exceed the hold time of L2 minus the contamination delay through the previous latch and logic L1 and PE1. A lower bound of zero delay is typically sufficient.

Figure 3:
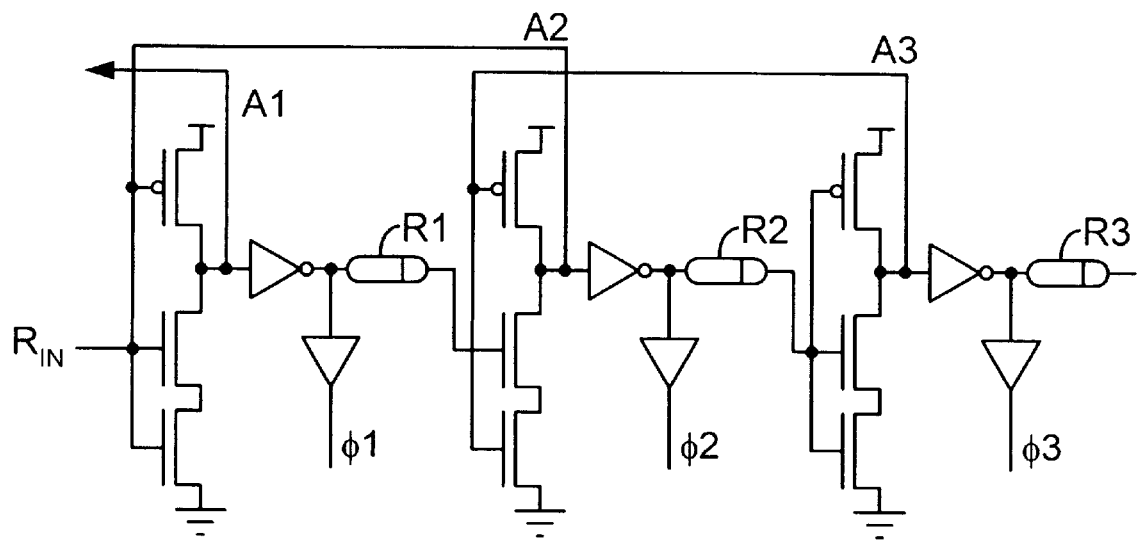
FIG. 3 is a circuit schematic illustrating a combination of generalized C-elements and delay lines to form a control chain.
Figure 4:
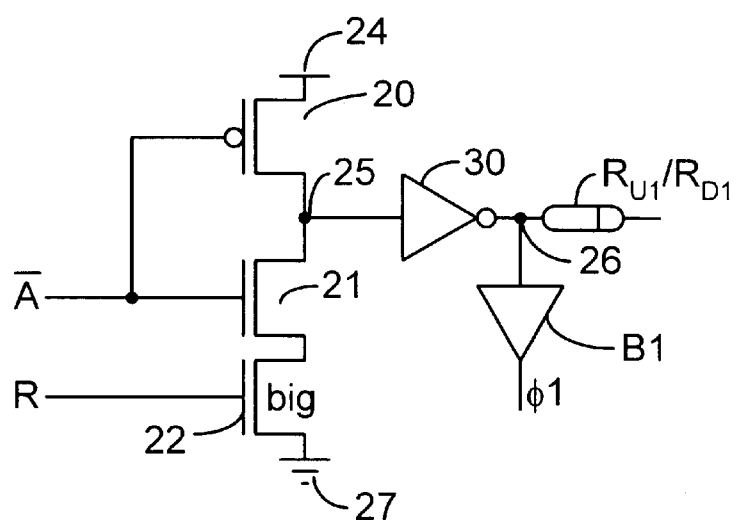
FIG. 4 is a circuit schematic of a single Muller C-element with adjustable delay that favors the acknowledge input.

As indicated above, another constraint on the delay is the hand shaking constraint. A latch must not become opaque until its successor latch becomes transparent. This keeps a latch transparent for an adequate amount of time to assure that data moves through the pipeline to fill each stage. This constraint requires $A_U$ to be nonnegative. In summary, the pipeline constraints are that $A_U$ and $A_D$ must be nonnegative and that $R_U$ must track the logic delay. $R_D$ is not constrained. Thus, because one or the other of the delays is not necessary, the operating speed of the control system can be improved by using a generalized Muller C-element as depicted in FIGS. 3 and 4. FIG. 3 illustrates a control chain, while FIG. 4 illustrates a single Muller C-element with delay in which input A is favored. As shown there, the Muller C-element includes a first transistor 20, a second transistor 21 and a third transistor 22. Transistor 20 is connected between a first potential source 24 and an output node 25. Transistors 21 and 22 are serially connected between the output node 25 and the second potential source 27. The request signal R controls a large transistor 22, while the complement of the acknowledge signal A controls transistors 20 and 21. An inverter 30 is connected between node 25, and the node 26 coupled to buffer B1 and delay element $R_{U1}/R_{D1}$. The acknowledgment signal will turn on only one of transistors 20 or 21, attempting to pull node 25 toward potential 24 or potential 27. The circuit behaves as a generalized Muller C-element, producing a high output when R is high and A is low, and producing a low output when A is high.

The previous analysis showed that $A_U$ and $A_D$ both must be nonnegative and that $R_U$ must depend on the delay of the datapath, but that $R_D$ is unconstrained. A standard Muller C-element with two NMOS and two PMOS transistors has a logic effort of two on each terminal. Because $R_D$ is not constrained, one of the PMOS transistors in the forward path can be eliminated, producing the simplified control circuit shown in FIG. 3. The logical effort of this element is 4/3 on the A terminal and 2/3 on the R terminal, a significant reduction over the regular C-element that should provide a speed advantage.

Even more speedup on the critical A terminal may be achieved at the expense of greater loading on the R terminal. Having the delay only on the R terminal is useful because this delay will match the delay of the processing element or combinational logic. At the same time, however, the delay on the A terminal will be minimized to improve throughput. The use of a larger transistor 22 unbalances the Muller C-element and shifts the A input to the inner transistors to minimize this A delay, allowing the logical effort on the A input to approach 1 at the expense of the effort on the R input.

Figure 5:
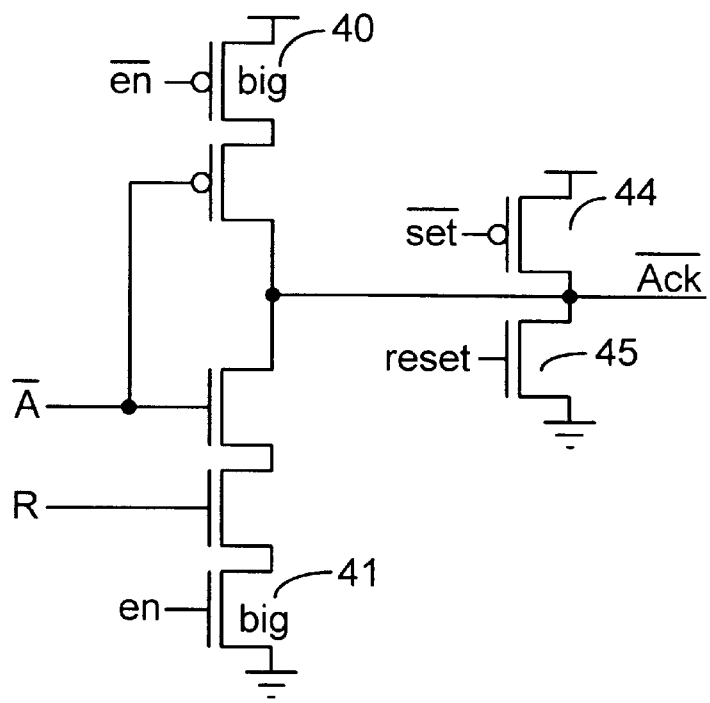
FIG. 5 is a circuit schematic illustrating a more robust implementation of the circuit shown in FIG. 4.

Most implementations of a Muller C-element require a disable signal and reset and set transistors. This is shown in FIG. 5. As shown, extra enable transistors 40 and 41 are provided to permit disabling the Muller C-element altogether. Also shown are set and reset transistors 44 and 45 for setting and resetting the acknowledgment line.

Finally, when the delay from latch to latch is very short as it is in a FIFO having minimal or no logic in the processing element, it is desirable to minimize the R delay. This can be done by using the disable transistors as an adjustable delay element so that additional stages of gates that increase the minimum R delay are not necessary.

Figure 6:
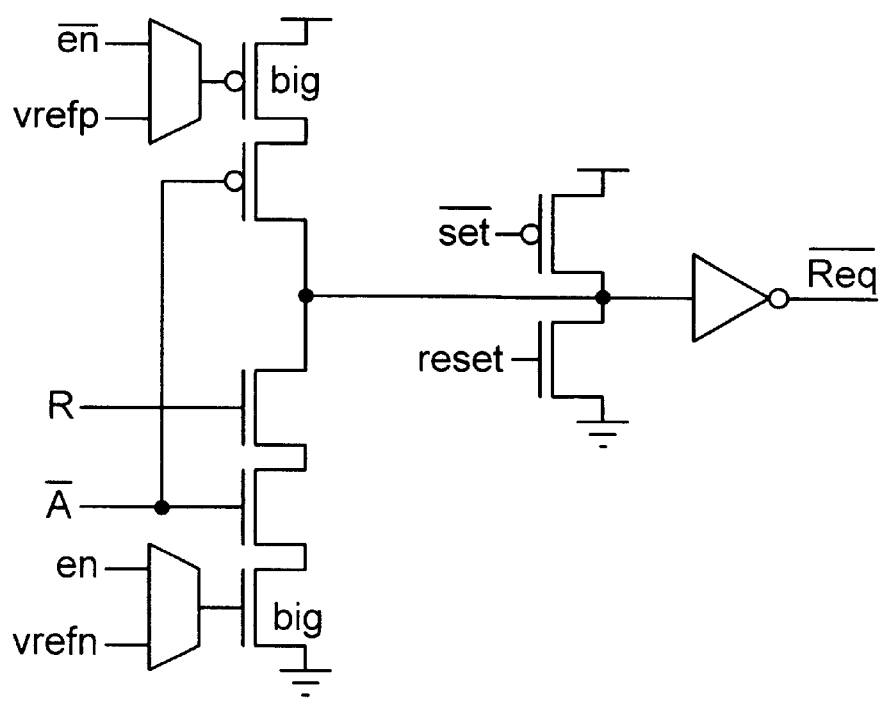
FIG. 6 is a circuit schematic of a Muller C-element with a controllable adjustable delay.

FIG. 6 is a circuit schematic showing a modification of the circuit in FIG. 5. In FIG. 6, by the multiplexers controlled with a reference voltage, the C-element also incorporates the delay element. In FIG. 6 the enable (en) node is used to turn the inverter off for a set or reset. The vref node is used to starve the inverter.

The latency and throughput of the circuit described can be calculated by assuming that the acknowledge delays $A_{U1}/A_{D1}$, $A_{U2}/A_{D2}$ and $A_{U3}/A_{D3}$ are as short as possible. Assuming an initially opaque latch, then the rising delay of $R_{U1}$, $R_{U2}$ and $R_{U3}$ will be the longest delays, and the falling delays will not be used. Therefore, the forward latency will be just the rising delay $R_{U1}$, $R_{U2}$ and $R_{U3}$.

The throughput is set by the time required by an event to propagate through two stages and the acknowledge to return from the second stage. The minimum cycle time will be twice the request rising edge delay, plus the falling edge delay for the acknowledge signal and the rising edge delay for the acknowledge signal: $2R_U+A_D+A_U$. The delay for the Muller C-element can be included within the request rising edge delay.

The logical effort around the loop of the circuit shown in FIG. 2 is 1*(2/3)*1*(2/3)*(4/3)*(4/3)=64/81. Therefore, each of the five stages has an effort delay just under 1 and a parasitic delay averaging just over 1 for a total of about ten delay units. The minimum transparency time of each latch will be the rising edge delay of the request signal plus the rising edge delay of the acknowledge signal: $R_U+A_U$.

The preceding has been a description of the preferred embodiment of the invention. It will be appreciated that variations can be made within the specific block diagrams and circuits illustrated without departing from the spirit of the invention, which is defined by the appended claims. For example, latches may be normally transparent instead of normally opaque, and different generalized C-elements may be used.

What is claimed is:

1. A control circuit for a datapath comprising:

a first Muller C-element having a first output terminal coupled to control a first node;

a second Muller C-element having a second output terminal coupled to control a second node;

a third Muller C-element having a third output terminal coupled to control a third node;

a first delay element having an adjustable delay connected between the first node and a first input terminal of the second Muller C-element;

a second delay element having an adjustable delay connected between the second node and a first input terminal of the third Muller C-element;

a first datapath element coupled to be controlled by the first node;

a second datapath element coupled to be controlled by the second node;

a third datapath element coupled to be controlled by the third node;

a first logic circuit coupled between the first datapath element and the second datapath element;

a second logic circuit coupled between the second datapath element and the third datapath element;

a first driver circuit coupled between the first node and the first datapath element;

a second driver circuit coupled between the second node and the second datapath element; and a third driver circuit coupled between the third node and the third datapath element.

2. A circuit as in claim 1 wherein the adjustable delay of each of the delay elements is adjusted by changing a potential applied to the delay element.

3. A circuit as in claim 1 wherein each of the datapath elements comprise latches.

4. A circuit as in claim 1 further comprising:

a third delay element having an adjustable delay connected between the second node and a second input terminal of the first Muller C-element; and a fourth delay element having an adjustable delay connected between the third node and a second input terminal of the second Muller C-element.

5. A Muller C-element having an adjustable delay comprising:
- a first transistor having a first electrode connected to receive an acknowledge signal, having a second electrode coupled a first potential source and having a third electrode coupled to a node;
- a second transistor and a third transistor serially connected between the node and a second potential source, the second transistor being connected to be controlled by the acknowledge signal and the third transistor being connected to be controlled by a request signal;
- a datapath element coupled to the node to be controlled thereby; and
- a delay element having an adjustable delay coupled to the node.

6. A Muller C-element as in claim 5 wherein the second transistor is coupled between the node and the third transistor.

7. A Muller C-element as in claim 6 wherein each of the transistors comprises a field effect transistor.

8. A Muller C-element as in claim 7 wherein the first transistors comprises a PMOS field effect transistor, and each of the second and third transistors comprise NMOS transistors.

9. A Muller C-element as in claim 8 further comprising a first inverter coupled between the node and the delay element having an adjustable delay using a current-starved inverter.

10. A Muller C-element as in claim 9 further comprising a first driver circuit coupled between the first inverter and the datapath element.

11. A Muller C-element as in claim 9 wherein the third transistor is larger than the second transistor.

12. A Muller C-element as in claim 5 further comprising:
- a fourth transistor connected between the first potential source and the first transistor;
- a fifth transistor connected between the second potential source and the second and third serially connected transistors; and
- wherein each of the fourth transistor and the fifth transistor are connected to receive an enable signal.

13. A Muller C-element as in claim 12 wherein each of the fourth and fifth transistors is larger than the first transistor.

14. A Muller C-element as in claim 12 further comprising:
- a sixth transistor connected between the node and the first potential source and connected to receive a set signal; and
- a seventh transistor connected between the node and the second potential source and connected to receive a reset signal.

15. A Muller C-element as in claim 14 further comprising:
- a first multiplexer coupled to control the fourth transistor, the first multiplexer having a first node coupled to receive a first potential signal, and a second input node coupled to receive the enable signal; and
- a second multiplexer coupled to control the fourth transistor, the first multiplexer having a first node coupled to receive a second potential signal, and a second input node coupled to receive the enable signal, whereby the Muller C-element incorporates an adjustable delay element.

16. A first, second and third sequentially connected Muller C-elements, in which an output node of the second Muller C-element provides an acknowledge signal for the first Muller C-element comprising:
- a first transistor having a first electrode connected to receive an acknowledge signal, having a second electrode coupled a first potential source and having a third electrode coupled to a node;
- a second transistor and a third transistor serially connected between the node and a second potential source, the second transistor being connected to be controlled by the acknowledge signal and the third transistor being connected to be controlled by a reset signal;
- a datapath element coupled to the node to be controlled thereby; and
- a delay element having an adjustable delay coupled to the node;
- wherein the reset signal of the second Muller C-element is provided by the delay element of the first Muller C-element, and wherein the reset signal of the third Muller C-element is provided by the delay element of the second Muller C-element; and
- the node of the second Muller C-element provides the acknowledge signal for the first Muller C-element, and the node of the third Muller C-element provides the acknowledge signal for the second Muller C-element.

17. A circuit as in claim 16 wherein the node of the first Muller C-element is coupled to a first datapath element, the node of the second Muller C-element is coupled to a second datapath element, and the node of the third Muller C-element is coupled to a third datapath element.

18. An asynchronous system comprising:
- a datapath having a plurality of stages for performing processing operations on data supplied thereto;
- a control path coupled to the datapath for controlling operation of the datapath, wherein the control path includes a sequence of elements, each for providing an output signal at an output node in response to the receipt of at least one input signal at an input node, each element including a Muller C-element which includes:
  - a first transistor having a first electrode connected to receive an acknowledge signal, having a second electrode coupled a first potential source and having a third electrode coupled to the output node;
  - a second transistor and a third transistor serially connected between the output node and a second potential source, the second transistor being connected to be controlled by the acknowledge signal and the third transistor being connected to be controlled by a request signal; and
- a sequence of adjustable delay elements coupled between output nodes of the elements and input nodes of other elements, to thereby control the operating speed of the control path;
- a stage of the datapath being coupled to the node to be controlled thereby.

19. A control path as in claim 18 wherein the Muller C-elements each have at least one input node coupled to an output node of an adjacent Muller C-element through one of the delay elements.

20. A control path as in claim 19 wherein the delay elements comprise delay elements whose delay is adjustable by use of a current-starved inverter.

21. A control path as in claim 20 wherein an output node of a preceding Muller C-element is coupled to an input node of a subsequent Muller C-element through a delay element having a delay greater than zero.

22. A control path as in claim 21 wherein an output node of a subsequent Muller C-element is coupled to an input node of a preceding Muller C-element through a delay element having a delay of at least zero.

23. A control circuit for a datapath comprising:
a first Muller C-element having a first output terminal coupled to control a first node;
a second Muller C-element having a second output terminal coupled to control a second node;
a third Muller C-element having a third output terminal coupled to control a third node;
a first delay element having an adjustable delay connected between the first node and a first input terminal of the second Muller C-element;
a second delay element having an adjustable delay connected between the second node and a first input terminal of the third Muller C-element;
a first datapath element coupled to be controlled by the first node;
a second datapath element coupled to be controlled by the second node;
a third datapath element coupled to be controlled by the third node, and wherein the first Muller C-element includes:
  a first transistor having a first electrode connected to receive an acknowledge signal, having a second electrode coupled a first potential source and having a third electrode coupled to the first node; and
  a second transistor and a third transistor serially connected between the first node and a second potential source, the second transistor being connected to be controlled by the acknowledge signal and the third transistor being connected to be controlled by a request signal.

* * * * *